(12) United States Patent
Katakura et al.

(10) Patent No.: US 7,076,919 B2
(45) Date of Patent: Jul. 18, 2006

(54) AUTOMOBILE WINDOW PANE STRUCTURE

(75) Inventors: Seiji Katakura, Osaka (JP); Takayuki Koyama, Osaka (JP); Kiyomi Nakagawa, Hofu (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/745,220

(22) Filed: Dec. 23, 2003

(65) Prior Publication Data

US 2004/0245803 A1    Dec. 9, 2004

(30) Foreign Application Priority Data

Dec. 27, 2002  (JP) ............... 2002-380031

(51) Int. Cl.
*B60J 1/00*  (2006.01)
*B60J 1/14*  (2006.01)

(52) U.S. Cl. .............. 49/397; 49/398; 296/146.16
(58) Field of Classification Search ........... 296/216.02, 296/201, 146.16; 49/381, 386, 397, 398, 49/387
See application file for complete search history.

(56) References Cited

U.S. PATENT DOCUMENTS

| 4,363,191 | A | * | 12/1982 | Morgan | ............... 49/381 |
| 4,396,221 | A | * | 8/1983 | Morgan et al. | ........... 296/96.11 |
| 4,511,129 | A | * | 4/1985 | Kishino | ............... 296/146.16 |
| 5,083,835 | A | * | 1/1992 | Rossini | ............... 296/201 |
| 5,516,184 | A | * | 5/1996 | Kreye et al. | ........... 296/146.16 |
| 5,551,197 | A | | 9/1996 | Repp et al. | |
| 6,128,860 | A | * | 10/2000 | Repp et al. | ............... 49/398 |

FOREIGN PATENT DOCUMENTS

JP    HEI 7-101238    4/1995

* cited by examiner

*Primary Examiner*—Dennis H. Pedder
(74) *Attorney, Agent, or Firm*—Rankin, Hill, Porter & Clark LLP

(57) ABSTRACT

An automobile window pane structure includes a window pane, a resin layer injection molded on the front part of an interior surface of the window pane, and a hinge member including a base embedded in the layer. The hinge member further includes a pair of elastically deformable supporting arms extending from the base, and attachment portions provided at distal ends of the respective supporting arms and having therein attachment openings for attachment to a sash or its vicinity.

10 Claims, 13 Drawing Sheets

AUTOMOBILE WINDOW PANE STRUCTURE

FIELD OF THE INVENTION

The present invention relates to an improvement in an automobile window pane structure which includes a window pane and a hinge member for mounting the window pane to a sash of an automotive body in such a manner as to allow the window pane to move between open and closed positions.

BACKGROUND OF THE INVENTION

Known automobile window pane structures include window panes, and hinges mounting the window panes to sashes of the automotive bodies in such a manner that the panes move between open and closed positions. One example of such structures is known from Japanese Patent Laid-Open Publication No. HEI 7-101238.

FIG. 15 hereof illustrates in cross-section the structure disclosed in the publication. The structure designated at 100 includes a pair of hinge members (only one shown) 103, and a window pane 106 mounted via the hinge members 103 to an automotive body 101 in such a manner as to move between open and closed positions. Each hinge member 103 has a base 104 attached to the body 101 through a bolt 102. The hinge member 103 has its distal end 105 adhered through urethane adhesive 107 to the inside of a rear end of the window pane 106.

The hinge member 103 is elastically deformable to allow the movement of the window pane 106 between the open and closed positions.

Because the base 104 is adhered to the inside of the window pane 106 through the adhesive 107, it becomes possible to prevent the base portion 104 and the adhesive 107 from being exposed to the outside of the window pane 106. This arrangement provides improved outer appearance of the structure 100.

For the structure 100, however, the distal end 105 of the hinge member 103 is adhered to the window pane 106 only through the adhesive 107. The distal end 105 would be undesirably peeled off from the window pane 106 if the distal end 105 less satisfactorily adheres to the window pane 106 due to, for example, insufficient adhesive strength of the adhesive 107.

In addition, the adhesive 107 used for adhesion of the distal end 105 to the window pane 106 is more expensive than the bolt 102.

The use of such a costly adhesive 107 makes it difficult to provide the structure 100 at a low cost.

FIG. 16 hereof illustrates another automobile window pane structure 110 for an automobile. The structure 110 includes an automotive body 111, a hinge member 113 and a window pane 116 mounted to the body 111 via the hinge member 113 in such a manner as to move between open and closed positions. More specifically, the hinge member 113 has a base 114 mounted to the body 111 through a bolt 112, and its distal end 115 mounted to a rear end of the window pane 116 through a bolt 117.

The hinge member 113 is elastically deformable to allow the movement of the window pane 116 between the open and closed positions.

Unlike the structure 100, the structure 110 has the advantage that the distal end 115 is not detached from the window pane 116 because the bolt 117 secures the distal end 115 of the hinge member 113 to the window pane 116 therethrough.

The bolt 117 has its head 117a (configured to provide decorative ness) exposed to the outside of the window pane 116, and hence provides unpleasant entire outer appearance of the structure 110. For the structure 110, therefore, there is left a room for improvement in its outer appearance.

FIG. 17 hereof illustrates another automobile window pane structure 120. The structure 120 includes a window pane 126 and a hinge member 121. The hinge member 121 includes a hinge body 122 and a molding portion 123 molded to cover part of the hinge body 122. The hinge member has its base portion 121a mounted to an automotive body 125 via a bolt 124. The window pane 126 has its rear end adhered to an inner surface of a distal end 121b of the molding portion 123 by adhesive (not shown) to achieve a fitting engagement between the distal end 121b and the rear end of the window pane 126.

The hinge member 121 is elastically deformable to allow the window pane 126 to move between the open and closed positions.

The structure 120 has the advantage that the distal end 121b of the molding 123 is securely adhered to the rear end of the window pane 126 and hence is unlikely to be detached or disengaged from the rear end of the windowpane 126.

However, the distal end 121b has its portion 121c exposed to the outside of the automotive body 125, and hence provides unpleasant entire outer appearance of the structure 120. Thus, like the structure 110, the structure 120 should have its improved outer appearance.

SUMMARY OF THE INVENTION

It is therefore an object of the present invention to provide an automobile window pane structure of improved outer appearance, which is produced at a low cost and includes a window pane and a hinge member having a base portion mounted to the window pane with tightness sufficient to eliminate concern over inadvertent detachment of the base portion from the window pane.

According to one aspect of the present invention, there is provided an automobile window pane structure comprising: a window pane; a hinge means for mounting the window pane to a sash of an automobile in such a manner as to allow movement of the window pane between open and closed positions; and a resin layer provided on an interior surface of the window pane for retaining the hinge means therein, the hinge means including: a base embedded in the resin layer; a pair of elastically deformable supporting arms extending from the base for supporting the window pane; and attachment portions each disposed at a distal end of each supporting arm and having an attachment opening formed therein for attachment to the sash or a vicinity thereof to allow each supporting arm to undergo elastic deformation for moving the window pane between open and closed positions.

Since the base has the pair of supporting arms connected thereto, the hinge means is increased in size. The base is embedded in the resin layer, and therefore can unite with the latter. With this arrangement, the hinge means can be securely mounted to the interior surface of the window pane via the resin layer.

Concurrently with molding operation of a molding along a peripheral edge of the window pane, the injection molding of the resin layer on the interior surface of the window pane is performed to achieve the embedment of the base in the resin layer. Namely, the insert molding of the resin layer for the embedment of the base therein can be carried out simultaneously with the molding operation of the molding along the peripheral edge of the window pane.

Because the operation of mounting the base to the window pane through the insert molding is performed together with the molding operation of the molding, it is therefore unnecessary to perform the operation of mounting the base to the window pane separately from the molding operation. There can be omitted an additional time which would be otherwise assigned only for mounting the base to the window pane.

Moreover, the base is embedded in the resin layer provided inside the window pane, and hence the base is not exposed to the outside of the window pane. Disposition of the base inside the window pane provides improved outer appearance of the structure.

The hinge means includes the attachment openings to be bolted to an automotive body. The openings are used to precisely position the hinge means in place in an injection mold when the resin layer is insert molded to embed the base therein.

During the insert molding, the hinge means is positioned in place in the injection mold with the attachment openings positioned precisely relative to the window pane. The hinge means thus disposed can be mounted to the window pane through the resin layer.

Preferably, the resin layer is injection molded on the interior surface of the window pane.

Desirably, the base includes a base body and projecting portions protruding from the base body towards the window pane.

By projecting towards the window pane, the projecting portions are embedded deeply in the resin layer. Thus, there is provided an increased distance between each projecting portion and a surface of the resin layer. The base is united with the resin layer, and thus the hinge means is more securely mounted through the resin layer to the interior surface of the window pane.

Preferably, the projecting portions are disposed in the vicinities of the supporting arms and projecting towards the window pane in the form of a convex curve. The projecting portions each has a hole formed centrally thereof. Each of the projecting portions has curved edges each of which is spaced from the base body to define a slit therebetween.

The projecting portions project in the form of a convex curve towards the window pane. Each projecting portion includes curved edges each of which is spaced from the base body to define a slit therebetween. With this arrangement, the projecting portions can be rendered elastically deformable.

The projecting portions are elastically deformable in conformity with deformation of the resin layer. The projecting portions thus remain embedded in the resin layer without being peeled away from the resin layer.

The projecting portions are disposed in the vicinities of the supporting arms in order to take measures against relatively large loads tending to be applied to the vicinities of the supporting arms. With this arrangement, it becomes possible to prevent the base from being peeled from the resin layer when the relatively large loads are applied to the vicinities of the supporting arms.

The projecting portion has the hole formed centrally thereof. The resin layer includes a resin filling the hole, and resins inside and outside the projecting portions. The resin in the hole is integral with the resins on the inside and outside of the projecting portions. During the insert molding of the resin layer, the resin better fills a gap between the projecting portion and the window pane by flowing through the hole.

The resin thus filling the gap securely adheres to the window pane, and the base is securely retained in the resin layer.

Preferably, the base further includes at least one inverted L-shaped protruding portion disposed in such a position as to avoid the projecting portions and protruding from the base body towards the window pane substantially in the form of an inverted L. The inverted L-shaped protruding portion is inclined relative to a straight line extending between the supporting arms.

The base includes the inverted L-shaped protruding portions. By protruding towards the window pane, the inverted L-shaped protruding portions are deeply embedded in the resin layer. Accordingly, there is provided an increased distance between each inverted L-shaped protruding portion and the surface of the resin layer. Since the base unites with the resin layer, the hinge means can be securely mounted to the interior surface of the window pane through the resin layer.

Preferably, the base includes a plurality of the inverted L-shaped protruding portions disposed adjacent each other. The inverted L-shaped protruding portions are disposed in a staggered fashion.

The adjacent inverted L-shaped protruding portions are disposed in the staggered manner, and thus the base can be prevented from being displaced longitudinally out of the resin layer.

Preferably, the base body has an edge having the pair of supporting arms extending therefrom. The base further includes reinforcing portions protruding from portions of the edge positioned in the vicinities of the supporting arms towards the window pane for reinforcing the edge.

The base body includes an edge having the supporting arms extending therefrom. The base body has reinforcing members protruding from portions of the edge positioned in the vicinities of the supporting arms towards the window pane. The edge is thus reinforced by these reinforcing portions. The reinforcing portions prevent the deformation of the edge. The hinge means having thus arranged reinforcing portions can be securely mounted to the interior surface of the window pane through the resin layer.

Preferably, the supporting arms have proximal ends connected with the edge, and the base further includes cutouts formed on sides of the proximal ends.

The base includes cutouts formed proximally of the supporting arms for facilitating the elastic deformation of the proximal ends of the supporting arms, when the window pane undergoes a force, to absorb the force.

The elastic deformation of the proximal ends of the supporting arms is advantageous because a stress in the hinge means produced by the application of the force to the window pane is prevented from being concentrated at the proximal ends.

The proximal ends of the supporting arms are elastically deformed to absorb the force exerted on the window pane and prevent the stress, produced by the exertion of the force, from being concentrated at the proximal ends. This makes it possible to prevent the base from being peeled from the resin layer.

Preferably, the base includes a base body having an edge having the supporting arms extending therefrom, and hook-shaped portions extending from portions of the edge positioned in the vicinities of the supporting arms to cover a peripheral edge of the window pane.

The base includes the hook-shaped portions disposed in the vicinities of the supporting arms to cover the peripheral edge of the window pane. By covering the peripheral edge, the hook-shaped portions are prevented from coming off the peripheral edge of the window pane.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Reference will now be made to exemplary embodiments of the present invention which are illustrated in the accompanying drawings. The same reference numbers will be used throughout the drawings to represent the same or like parts.

Figure 1:
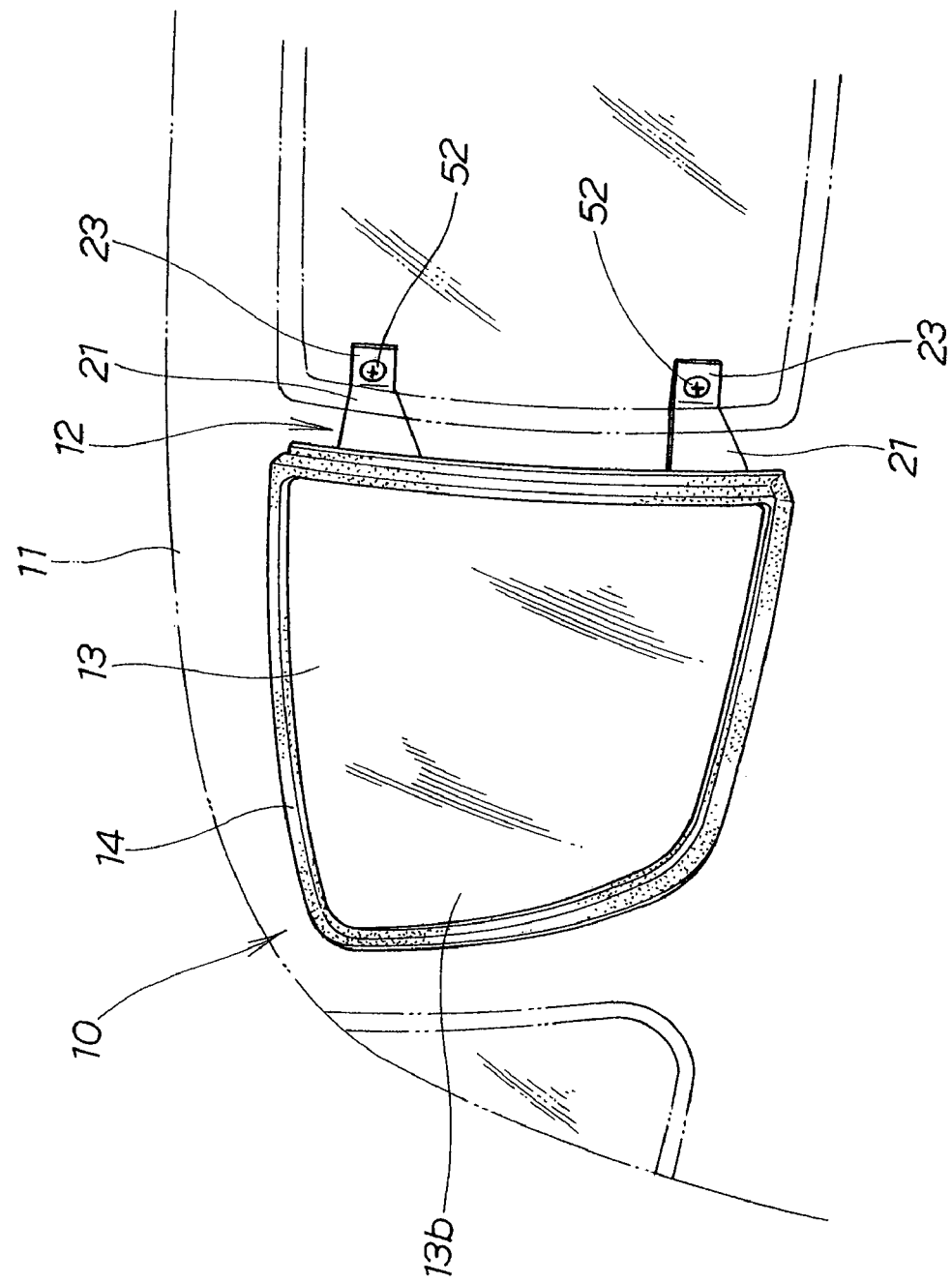
FIG. 1 is a side view of a rear part of an automobile including an automobile window pane structure according to a first embodiment of the present invention.

Referring to FIG. 1, an automobile 11 is shown including an automobile window pane structure 10 according to a first embodiment of the present invention. The structure 10 includes a window pane 13 and a hinge member 12 for mounting the window pane 13 to a sash 11a (see FIG. 6) of, for example, a rear quarter window to allow the window pane 13 to pivot between open and closed positions. The window pane 13 has a molding 14 injection molded along a peripheral end 13a (See FIG. 6) thereof. The molding 14 is formed of a thermoplastic resin such as PVC (polyvinyl chloride).

The window pane 13 has a handle (not shown) mounted on the inside of a rear end 13b thereof. Grasping such a handle, a passenger in a passenger compartment of the automobile 11 can open the window pane 13 by moving the rear end 13b away from an automobile body (not designated) of the automobile 11, subjecting upper and lower supporting arms 21, 21 of the hinge member 12 to elastic deformation. It is to be noted that the window pane 13 can be held in the opened position by a retention means (not shown) disposed between the window pane 13 and the sash 11a, and that when the passenger moves the rear end 13b towards the automobile body to thereby close the window pane 13, the retention means holds the window pane 13 in the closed position.

Figure 2:
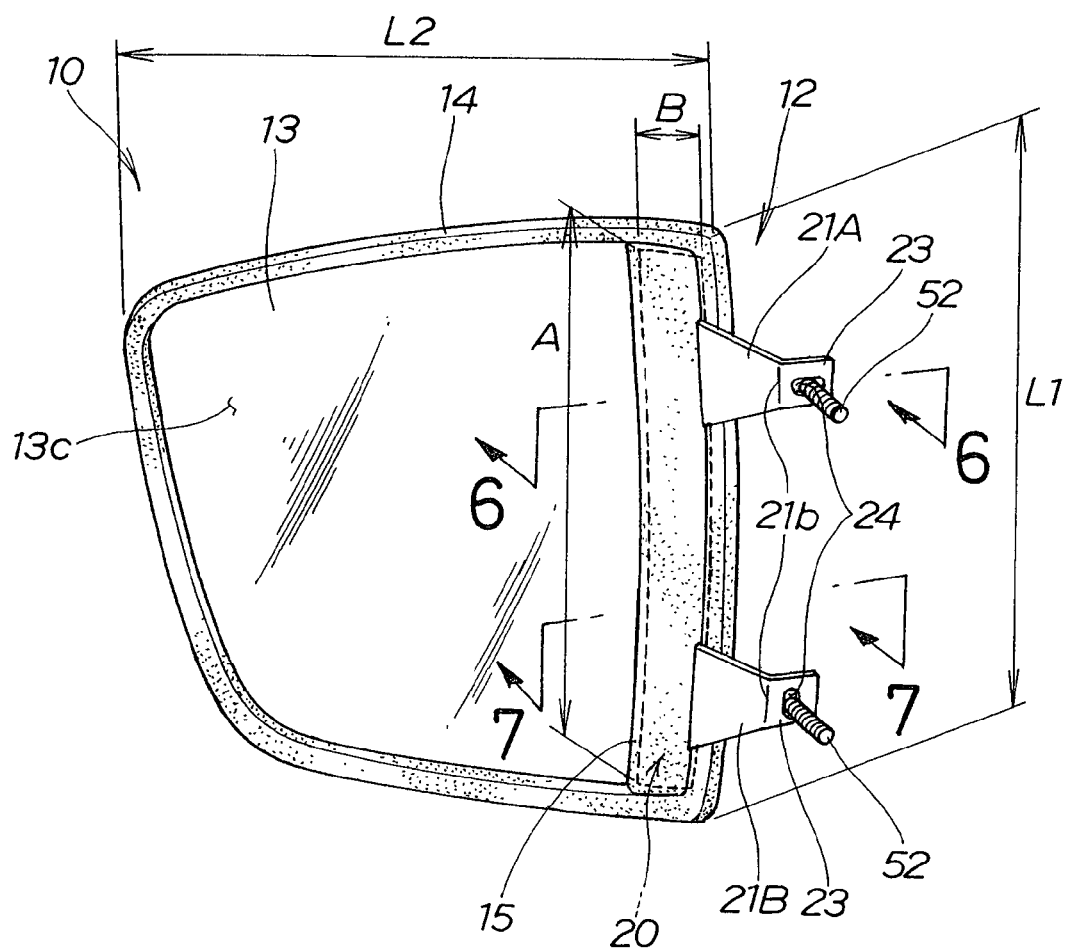
FIG. 2 illustrates the window pane structure of FIG. 1 as viewed from a passenger compartment of the automobile.

As shown in FIG. 2, the hinge member 12 is made from SUS (stainless steel). The hinge member 12 includes a generally rectangular plate or base 20 and one pair of the elastically deformable upper and lower supporting arms 21A, 21B extending inward and forward from the base 20. The base 20 is embedded in a resin layer 15 of the molding 14. The resin layer 15 is injection molded on a front part of an interior surface 13c of the window pane 13 during the molding operation. The hinge member 12 further includes one pair of upper and lower attachment portions 23, 23 extending forward from distal ends 21b of the supporting arms 21A, 21B. Each attachment portion 23 has an attachment opening 24 formed therethrough for attaching the corresponding supporting arm to the sash 11a or its vicinity.

Connection of the supporting arms 21A, 21B to the base 20 provides increased size of the hinge member 13. The embedment of the base 20 in the resinous layer 15 makes it possible to ensure that the base 20 is retained within the resin layer 15 and thus firmly held to the interior surface 13c of the window pane 13.

The base 20 has its length A which is 50% to 90% of the overall length L1 of the window pane 13. The base 20 has its width B which is 5% to 15% of the overall width L2 of the window pane 13.

If the length A is less than 50% of the length L1, the base 20 undesirably has its reduced surface area.

If the length A is more than 95% of the length L1, the base 20 is so long that it terminates near the peripheral end 13a of the window pane 13 and hence undesirably interferes with the molding 14.

For those reasons, the length A of the base 20 is best set to be 50% to 95% of the length L1 of the window pane 13.

If the width B is less than 5% of the width L2 of the window pane L2, the base 20 undesirably has its reduced surface area.

If the width B is more than 15% of the width L2, the base is so wide that the base can undesirably block the view of a passenger in the passenger compartment.

For those reasons, the width B of the base 20 is best set to be 5% to 15% of the width L2 of the window pane 13.

The base 20 preferably has its surface area of at least, for example, 72 square centimeters. The surface area of the base 20 is about five times that of a conventional one.

While the molding 14 is injection molded along the peripheral edge 13a of the window pane 13, the resin layer 15 is injection molded on the front part of the interior surface 13c of the window pane 13 in such a manner as to embed the base 20 therein. Namely, the base 20 is embedded in the layer 15 by insert molding.

Because the layer 15 is insert molded concurrently with the molding operation of the molding 14, there is no need for an additionally assigned time only for mounting the base 20 to the window pane 13.

This leads to reduced time necessary to manufacture the structure 10. Such a reduction in time provides both improved productivity and reduced cost of the structure 10.

The base 20 is embedded in the layer 15 injection molded on the interior surface 13c of the window pane 13. Thus, the base 20 is not exposed to the outside of the window pane 13. With the thus arranged base 20, the structure 10 has its improved outer appearance.

To insert mold the layer 15 around the base 20, the attachment opening 24 of the attachment portion 23 is positioned in place in an injection mold (not shown). With the opening 24 of the attachment portion 23 precisely positioned in the injection mold, therefore, the insert molding can be carried out satisfactorily to effect the embedment of the base 20 in the layer 15.

For better adhesion to the layer 15, the base 20 preferably has a primer applied to a surface thereof when the insert molding operation is performed.

Figure 3:
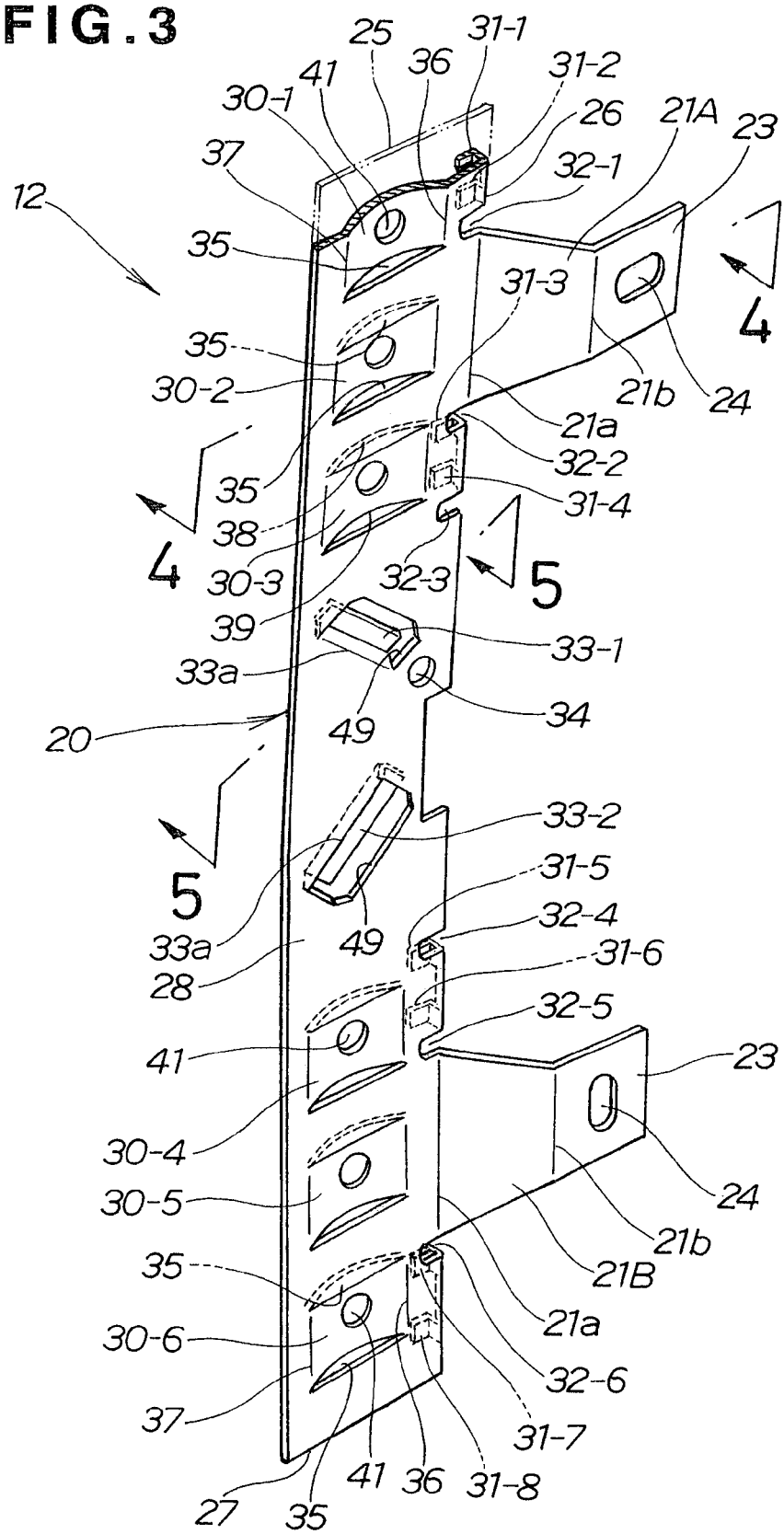
FIG. 3 is a perspective view of a hinge member of the window pane structure.

Referring to FIG. 3, the base 20 is a vertically extending plate of generally rectangular configuration and includes a base body 28. The base body 28 has a top edge 25 (shown by a phantom line) and a bottom edge 27 opposite the top edge 25. The upper supporting arm 21A extends forward and inwardly from a vertically elongated front edge 26 of the base body 28 and is disposed in the vicinity of the top edge 25. The arm 21A has its proximal end 21a connected with the front edge 26, and the distal end 21b connected with the upper attachment portion 23. Likewise, the lower supporting arm 21B extends forward and inwardly from the front edge 26 and is disposed in the vicinity of the bottom edge 27. The arm 21B has its proximal end 21a connected with the front edge 26, and the distal end 21b connected with the lower attachment portion 23. The upper and lower supporting arms 21A, 21B support the window pane 13. Providing the thus arranged arms 21A, 21B to the base 20 increases the entire area of the hinge member 12.

The base 20 includes a first set of three projecting portions 30-1 to 30-3 projecting in the form of a convex curve from the base body 28 towards the window pane 13 and disposed in the vicinity of the upper supporting arm 21A in vertically spaced relation to each other, and a second set of three projecting portions 30-4 to 30-6 projecting in the form of a convex curve from the base body 28 towards the window pane 13 and disposed in the vicinity of the lower supporting arm 21B in vertically spaced relation to each other.

It is to be noted that for the purpose of explanation, only in this embodiment, the reference numerals designating the projecting portions include hyphens and serial numbers in correspondence to the number of the projecting portions, such as "30-1" or "30-2".

Each projecting portion is elongated in the widthwise direction of the base 20 or in a front-and-rear direction of the base body 28. The middle projecting portion 30-2 of the first set is positioned behind the proximal end 21a of the upper supporting arm 21A. Similarly, the middle projecting portion 30-5 of the second set is positioned behind the proximal end 21a of the lower supporting arm 21B.

The base 20 includes two vertically spaced-apart pairs of reinforcing portions 31-1 to 31-4 projecting from portions of the front edge 26 positioned in the vicinity of the upper supporting arm 21A towards the window pane 13 to reinforce the portions of the front edge 26. The base 20 further includes two vertically spaced-apart pairs of reinforcing portions 31-5 to 31-8 projecting from portions of the front edge 26 positioned in the vicinity of the lower supporting arm 21B towards the window pane 13 to reinforce the portions of the front edge 26.

It is to be noted that for the purpose of explanation, only in this embodiment, the reference numerals designating the reinforcing portions include hyphens and serial numbers in correspondence to the number of reinforcing portions, such as "31-1" or "31-2".

The reinforcing portions of each pair are vertically spaced from each other.

The uppermost pair of the reinforcing portions 31-1, 31-2 is disposed above the proximal end 21a of the arm 21A. The second uppermost pair of the reinforcing portions 31-3, 31-4 is disposed below the proximal end 21a of the arm 21A.

The lowermost pair of the reinforcing portions 31-7, 31-8 is disposed below the proximal end 21a of the arm 21B. The second lowermost pair of the reinforcing portions 31-5, 31-6 is disposed above the proximal end 21a of the arm 21B.

The front edge 26 has six cutouts 32-1 to 32-6 formed along the length thereof. It is to be noted that for the purpose of explanation, only in this embodiment, the reference numerals designating the cutouts include hyphens and serial numbers in correspondence to the number of cutouts, such as "32-1" or "32-2".

The uppermost cutout 32-1 is formed between the proximal end 21a of the upper supporting arm 21A and the portion of the front edge 26 having the pair of reinforcing portions 31-1, 31-2 extending therefrom. The cutout 32-1 is open or adjacent to the proximal end 21a of the arm 21A.

The second uppermost cutout 32-2 is formed between the proximal end 21a of the upper supporting arm 21A and the portion of the front edge 26 having the pair of reinforcing portions 31-3, 31-4 extending therefrom. The cutout 32-2 is open or adjacent to the proximal end 21a of the arm 21A. The third uppermost cutout 32-3 is formed below the reinforcing portion 31-4.

The lowermost cutout 32-6 is formed between the proximal end 21a of the lower supporting arm 21B and the portion of the front edge 26 having the pair of reinforcing portions 31-7, 31-8 extending therefrom. The cutout 32-6 is open or adjacent to the proximal end 21a of the arm 21B.

The second lowermost cutout 32-5 is formed between the proximal end 21a of the lower supporting arm 21B and the portion of the front edge 26 having the pair of reinforcing portions 31-5, 31-6 extending therefrom. The cutout 32-5 is open or adjacent to the proximal end 21a of the arm 21B. The third lowermost cutout 32-4 is formed above the reinforcing portion 31-5.

The base 20 further includes one pair of upper and lower protruding portions 33-1, 33-2 disposed centrally of the base body 28 and protruding from the base body 28 towards the window pane 13 in the form of an inverted L. More specifically, the protruding portions 33-1, 33-2 are positioned between the bottom projecting portion 30-3 of the first set and the top projecting portion 30-4 of the second set. The upper and lower protruding portions 33-1, 33-2 are inclined relative to the vertical direction of the base body 28 so that they are disposed in a staggered fashion.

The base body 28 further has a hole 34 formed therethrough for serving as a gate for resin during the insert molding operation. The hole 34 is located near the upper protruding portion 33-1.

Each of the projecting portions 30-1 to 30-6 is elongated in a widthwise direction of the base body 28. Each of the projecting portions 30-1 to 30-6 has front and rear edges 36, 37 connected to or continuous with the base body 28, and upper and lower curved edges 38, 39. Each of the upper and lower edges 38, 39 projects in the form of a convex curve towards the window pane 13 to define a slit 35 in cooperation with the base body 28. The slit 35 is elongated in the widthwise direction of the base body 28. The slit 35 formed between the upper edge 38 and the base body 28 is vertically spaced a given distance from the slit 35 formed between the lower edge 39 and the base body 28. Each of the projecting portions 30-1 to 30-6 has a hole 41 formed centrally thereof. The slit 35 has its width of, for example, 1 mm.

The projecting portion (30-1 to 30-6) projects like an arched bridge towards the window pane 13. Each of the upper and lower edges 38, 39 is curved towards the window pane 13 to provide the widthwise elongated slit 35 between its edge and the base body 28. The projecting portion having the slits oriented in the widthwise direction of the base 20 is elastically deformable. The hole 41 is, for example, 6 mm in diameter.

Each of the central protruding portions 33-1, 33-2 of inverted L-shaped configuration is inclined relative to a line extending between the upper and lower supporting arms 21A, 21B or relative to the longitudinal direction of the base body 28. The protruding portion 33-1 (33-2) in the inclined position has a greater length than in a lying position.

According to the present invention, the base 20 has the two central protruding portions 33-1, 33-2 disposed in the staggered fashion. Providing the thus arranged protruding portions 33-1, 33-2 makes it possible to prevent the base 20 from being displaced vertically out of the resin of the layer 15 when the base 20 is embedded in the resin layer 15.

Because the cutouts 32-1 to 32-3 are formed at portions of the front edge 26 positioned on upper and lower sides of the proximal end 21a of the upper supporting arm 21A, the proximal end 21a of the upper supporting arm 21A can deform easily. Likewise, the cutouts 32-4 to 32-6 are formed at portions of the front edge 26 positioned on upper and lower sides of the proximal end 21a of the lower supporting arm 21B, the proximal end 21a of the lower supporting arm 21B can deform easily.

The reason why these cutouts are formed on the portions of the front edge 26 positioned on the upper and lower sides of the proximal ends 21a will be described in detail with reference to FIG. 6.

Each of the upper and lower supporting arms 21A, 21B is decreased in width from the proximal end 21a towards the distal end 21b to provide a generally trapezoidal configuration. The supporting arm is a deformable plate extending obliquely forward from the front edge 26 such that the distal end 21b is remoter from the window pane 13 than the proximal end 21a. The attachment portion 23 extends forward from the distal end 21b substantially in parallel to the base body 28.

Figure 4:
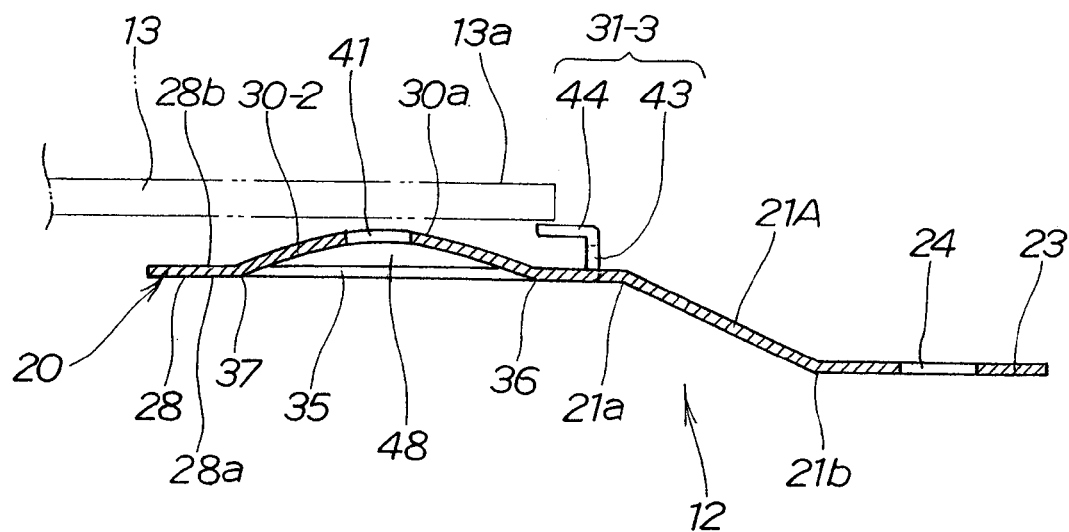
FIG. 4 is a cross-sectional view taken along line 4—4 of FIG. 3.

Referring to FIG. 4, each reinforcing portion includes a leg 43 extending from the front edge 26 towards the window pane 13 in perpendicular relation to the base body 28. The leg 43 has its distal end 44 bent to extend in opposed relation to the base body 28.

The bent leg 43 having the thus bent distal end 44 provides a generally L-shaped configuration as viewed from the window pane 13. The front edge 26 has the two pairs of reinforcing portions 31-1 to 31-4 provided at its portions positioned on the upper and lower sides of the proximal end 21a of the upper supporting arm 21A. By these reinforcing portions, the front edge 26 is thus reinforced at its portions positioned in the vicinity of the upper supporting arm 21A. Similarly, the front edge 26 has the two pairs of the reinforcing portions 31-5 to 31-8 provided at its portions positioned on the upper and lower sides of the proximal end 21a of the lower supporting arm 21B. By these reinforcing portions, the front edge 26 is thus reinforced at its portions positioned in the vicinity of the lower supporting arm 21B.

The projecting portion has the front and rear sides 36, 37 continuous or integral with the base body 28, and a central portion 30a projecting in the form of a convex curve towards the window pane 13. The base body 28 has its outer surface 28b facing towards the window pane 13. The projecting portion is thus configured to take the form of an arched bridge.

The central portion 30a is curved to provide a space or recess 48 on the same side as an inner surface 28a of the base body 28. The inner surface 28a is remoter from the window pane 13 than the outer surface 28b.

Figure 5:
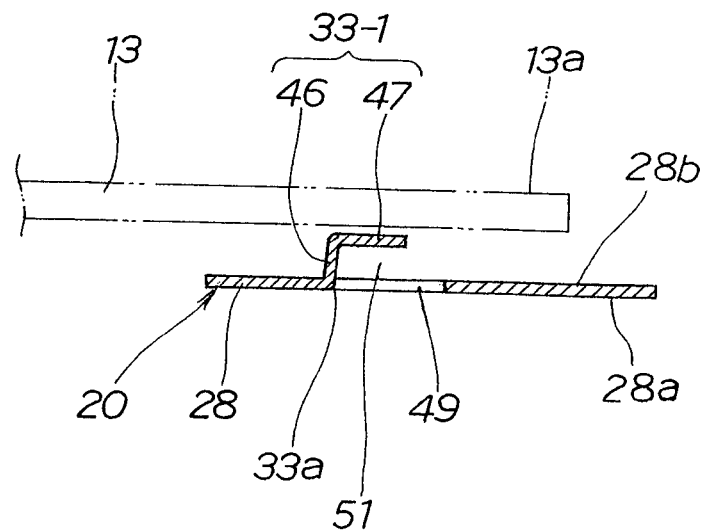
FIG. 5 is a cross-sectional view taken along line 5—5 of FIG. 3.

Referring to FIG. 5, the central protruding portions 33-1, 33-2 are of inverted L-shaped cross-section and protrude from the base body 28 towards the window pane 13. The protruding portion 33-1 (33-2) is obtained through the following manner.

The base body 28 is slit therein to provide a U-shaped slit 49 and a flap having its proximal end 33a connected to the base body 28. Such a flap is then bent towards the window pane 13. Next, the flap is bent substantially at its center to provide the central protruding portion of inverted L-shaped configuration.

The central protruding portion includes a leg 46 extending from the proximal end 33a towards the window pane 13 and a distal end 47 extending from the leg 46 towards the front edge 26 in parallel to the base body 28.

The leg 46 and the distal end 47 cooperate with each other to define the generally inverted L-shaped configuration. The distal end 47 is closer to the outer surface 28b than to the inner surface 28a.

Because the protruding portion protrudes towards the window pane 13, the distal end 47 has a space 51 formed on a side thereof opposite to the window pane 13.

Figure 6:
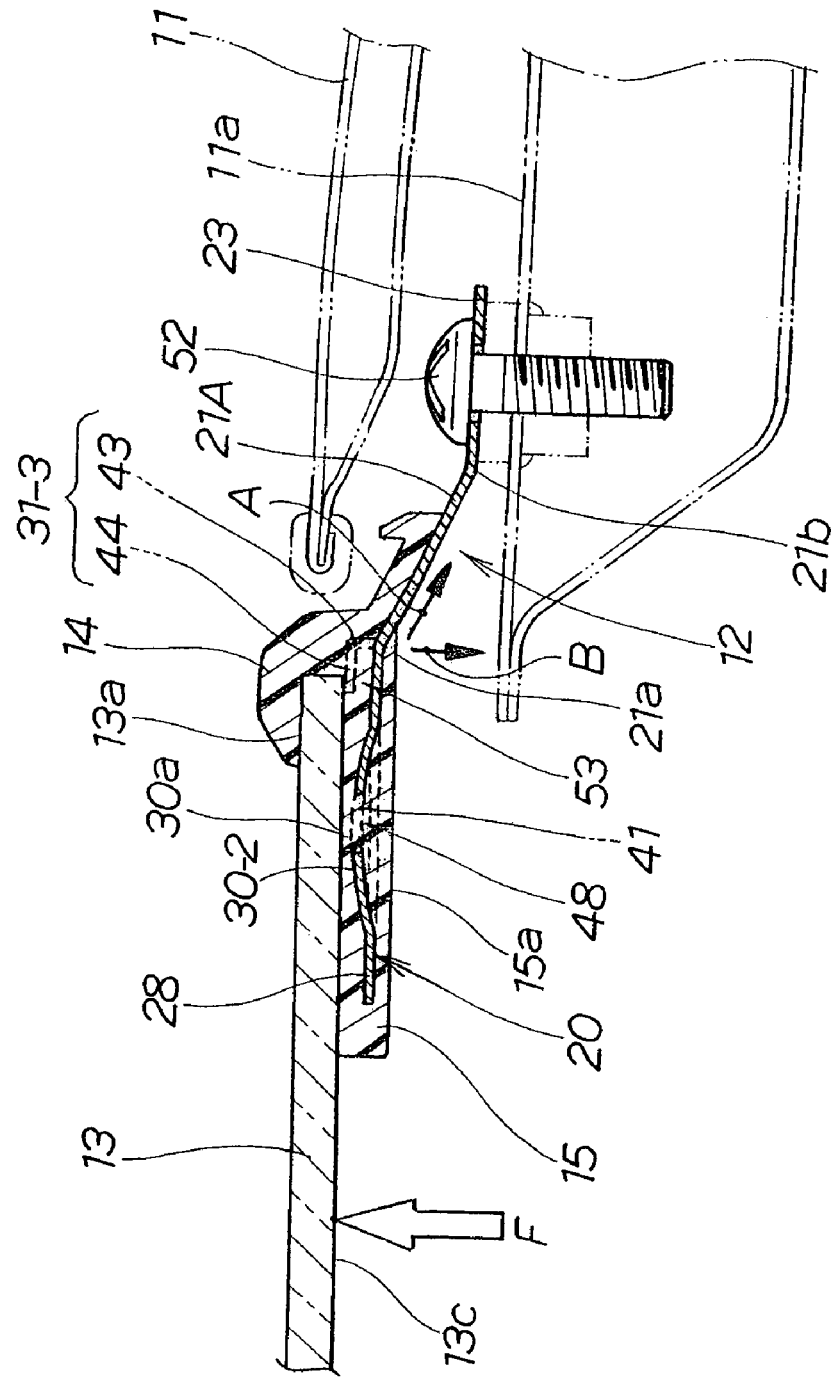
FIG. 6 is a cross-sectional view taken along line 6—6 of FIG. 2.

Referring to FIG. 6, as the molding 14 is injection molded along the peripheral end 13a of the window pane 13, the resin layer 15 is injection molded on the interior surface 13c of the window pane 13 to embed the base 20 therein. The attachment portion 23 extending from the upper supporting arm 21A is fixed to the sash 11a through a bolt 52.

Each of the projecting portions 30-1 to 30-6 is close to the window pane 13 to provide the recess 48. The curvature of the projecting portion towards the window pane 13 provides increased distance between the central portion 30a and an interior surface 15a of the layer 15. Because the recess 48 is filled with the resin of the layer 15, the projecting portion is deeply embedded in the resin layer 15.

Each projecting portion is convexly curved towards the window pane 13 to provide the slits 35 between the base body 28 and the respective ones of the upper and lower edges 38, 39. With this arrangement, the projecting portion can be elastically deformed following the deformation of the resin layer 15.

The projecting portion remains embedded in the resinous layer 15 so that the former can not be peeled from the layer 15.

These projecting portions 30-1 to 30-6 are provided in the vicinities of the upper and lower supporting arms 21A, 21B each tending to undergo a relatively large force.

Provision of such projecting portions is advantageous because it becomes possible to prevent the base 20 from being peeled from the layer 15 when relatively large loads are applied to the vicinities of the arms 21A, 21B.

Each of the projecting portions 30-1 to 30-6 has the hole 41 formed substantially at the central portion 30a thereof. The hole 41 allows resin to flow therethrough to thereby fill a gap formed between the projecting portion and the window pane 13 during the insert molding of the resinous layer 15 around the projecting portion of the base 20.

The resin filling the gap firmly adheres to the window pane 13, and the resin layer 15 retains the base 20 therein. The resin filling the hole 41 is connected or integral both with the resin between the window pane 13 and the projecting portions 30-1 to 30-8 and with the resin including the interior surface 15a.

The resin filling the gap between the window pane 13 and the respective ones of the projecting portions 30-1-30-6 firmly adheres to the window pane 13. The resins inside and outside the projecting portions 30-1 to 30-8 are integral with the resin filling the hole 41 to thereby provide the resin layer 15. This arrangement becomes possible to prevent the layer 15 from being peeled from the respective projecting portions.

The front edge 26 has the pairs of reinforcing portions 31-1 to 31-4 at its portions positioned on the upper and lower sides of the proximal end 21a of the upper supporting arm 21A to reinforce the front edge 26.

Similarly, the front edge 26 has the pairs of reinforcing portions 31-5 to 31-8 at its portions positioned on the upper and lower sides of the proximal ends 21a of the lower supporting arm 21B to reinforce the front edge 26.

Provision of the reinforcing portions 31-1 to 31-8 is advantageous because it becomes possible to prevent deformation of the front edge 26, and to prevent the layer 15 and base 20 from being peeled from each other.

The bent distal end 44 of each reinforcing portion terminates closely to the peripheral end 13a of the window pane 13 to provide a space 53 between the distal end 44 and the base body 28.

Disposition of the distal end 44 closely to the window pane 13 provides a large distance between the distal end 44 and the interior surface 15a of the resin layer 15.

Since the space 53 is filled with the resin of the resin layer 15, the distal end 44 is deeply embedded in the layer 15. With this arrangement, the resin layer 15 is united with the base 20 to securely mount the hinge member 12 to the interior surface 13c of the window pane 13.

The cutouts 32-1 to 32-3 are formed in the portions of the front edge 26 positioned on the upper and lower sides of the proximal ends 21a of the upper supporting arm 21A to allow the proximal end 21a of the arm 21A to undergo elastic deformation easier. Thus, when the window pane 13 is subjected to a force F shown by an arrow, the proximal end 21a of the arm 21A elastically deforms to absorb part of the force F.

The elastic deformation of the proximal end 21a of the arm 21A is advantageous because stress produced by the application of the force F to the window pane 13 is not concentrated at the proximal end 21a.

More specifically, when the force F is exerted on the window pane 13, the proximal end 21a of the upper supporting arm 21A elastically deforms whereby the direction of a tension in the upper supporting arm 21A is changed from a direction A to a direction B.

If the tension were directed in the direction A, there would be heightened the possibility of the concentration of the stress at the proximal end 21a of the arm 21A. Consequently, the base 20 would be peeled from the resin layer 15.

In the illustrated embodiment, however, the proximal end 21a elastically deforms to change the direction of the tensile stress to the direction B. Without the stress being concentrated at the proximal end 21a, the tension thus directed in the direction B is distributed to act throughout the base 20. Thus, it becomes possible to prevent the base 20 from starting to be peeled at the proximal end 21a.

It will be appreciated that the cutouts 32-4 to 32-6 formed in the portions of the front edge 26 positioned on the upper and lower sides of the proximal end 21a of the lower supporting arm 21B provide the same function and advantage as the cutouts 32-1 to 32-3, as described above.

Figure 7:
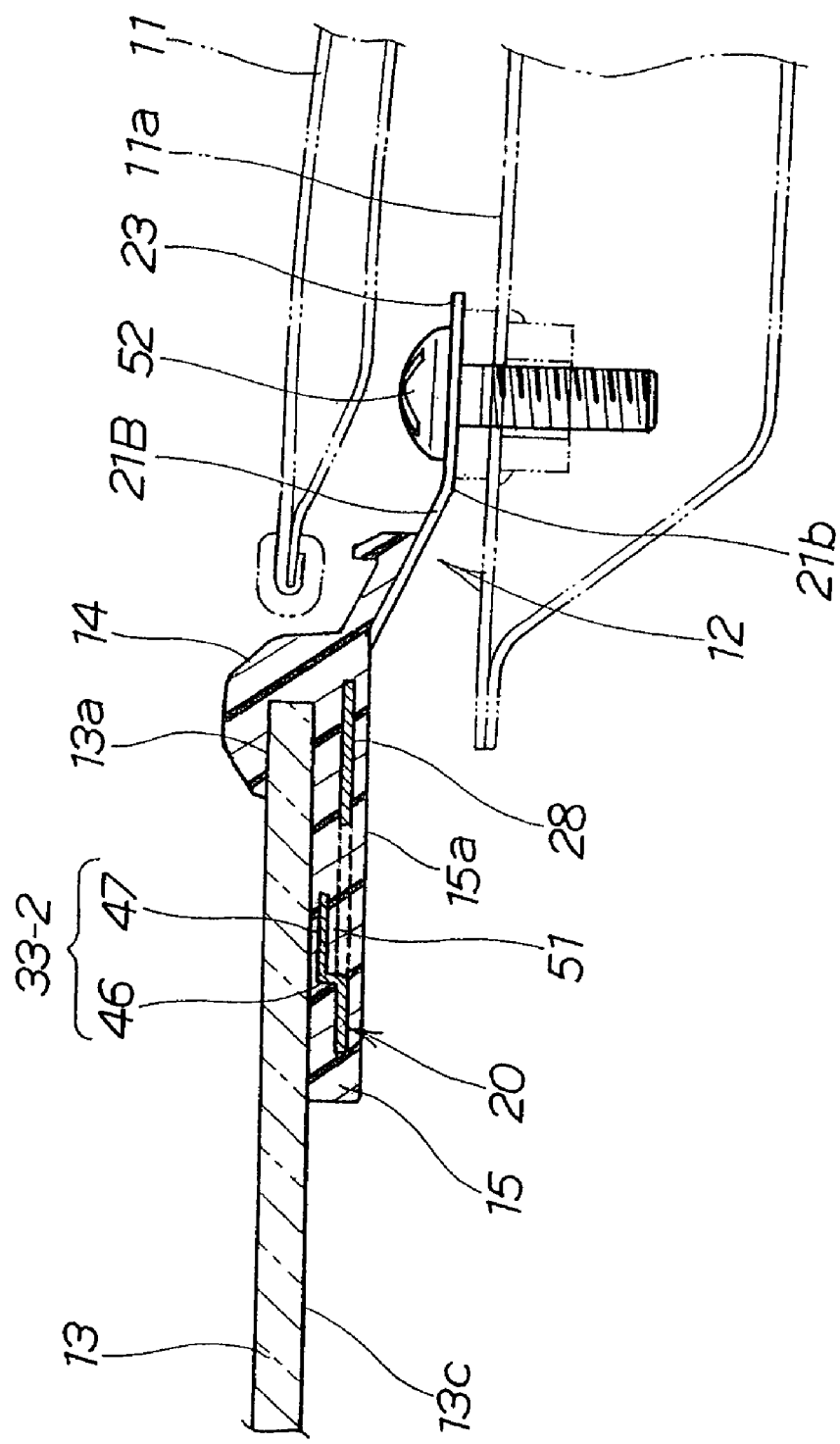
FIG. 7 is a cross-sectional view taken along line 7—7 of FIG. 2.

Referring to FIG. 7, the molding 14 is injection molded along the peripheral end 13a while the resin layer 15 is injection molded (i.e., insert molded) on the interior surface 13c to embed the base 20 therein. The attachment portion 23 extending from the lower supporting arm 21B is fixed to the sash ha through the bolt 52.

The distal end 47 of each of the protruding portions 33-1, 33-2 is positioned close to the window pane 13 to provide the space 51 on the side of the distal end 47 opposite to the window pane 13. Providing the respective protruding portions with the distal ends 47 close to the window pane 13 ensures a large distance between each distal end 47 and the interior surface 15a.

The space 51 is filled with the resin of the layer 15 and hence the protruding portions 33-1, 33-2 can be deeply embedded in the layer 15. With the protruding portions deeply embedded in the layer 15, the base 20 is firmly retained within the layer 15.

Figure 8:
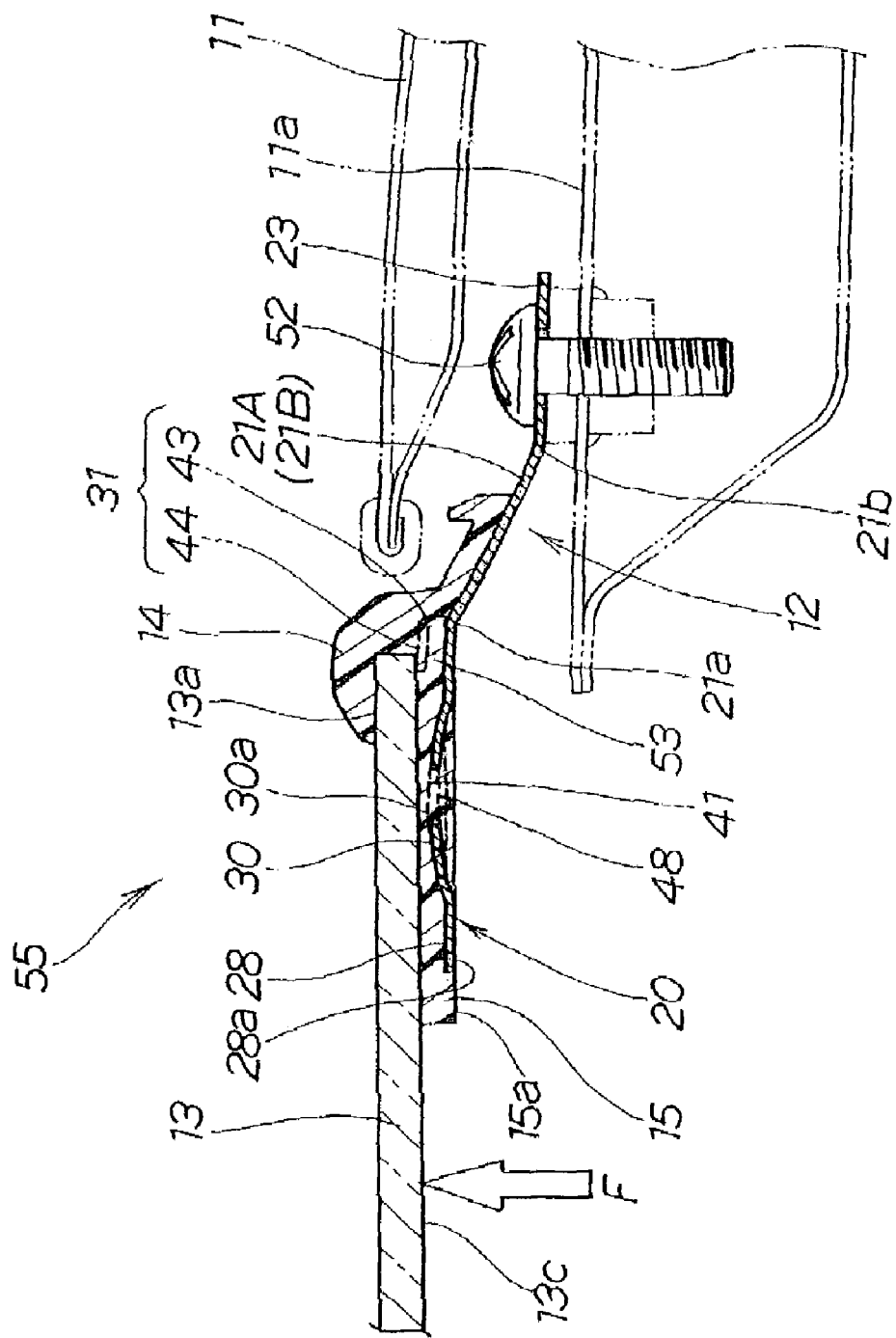
FIG. 8 is a cross-sectional view of an automobile window pane structure according to a second embodiment of the present invention.

As shown in FIG. 8, an automobile window pane structure 55 according to a second embodiment of the present invention differs from that of the first embodiment only in that the inner surface 28a of the base body 28 is flush with the interior surface 15a of the resin layer 15.

The structure 55 has the same advantage as the structure 10. Disposition of the inner surface 28a in flush with the interior surface 15a eliminates part of the resin layer 15 formed on the inner surface 28a as found in FIG. 6. To provide the inner surface 28a flush with the interior surface 15a, the base 20 can be set in direct contact with the inside of an injection mold (not shown) during the insert molding of the layer 15. The setting of the base 20 in the injection mold in this manner facilitates the insert molding of the resin layer 15.

Figure 9:
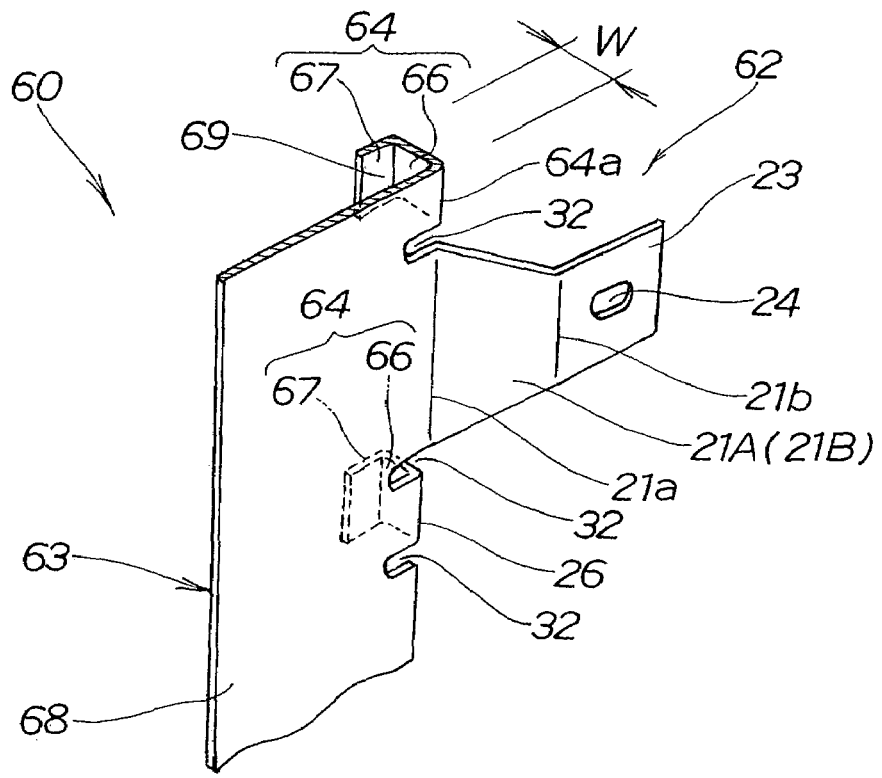
FIG. 9 is a fragmentary perspective view of a hinge member of an automobile window pane structure according to a third embodiment of the present invention.

As shown in FIG. 9, an automobile window pane structure 60 according to a third embodiment of the present invention includes a hinge member 62 having a base 63. Except for the base 63 of the hinge member 62, the structure 60 is identical in arrangement to the structure 10.

The base 63 includes a base body 68 and plural hook-shaped portions 64 disposed at portions of the front edge 26 positioned in the vicinities of the upper and lower supporting members 21A, 21B. The respective hook-shaped portions 64 extend from the front edge 26 to cover portions of the peripheral edge 13a positioned in the vicinities of the supporting arms 21A, 21B.

Each hook-shaped portion 64 includes a leg 66 extending outward from a proximal end 64a thereof or the front edge 26 substantially in perpendicular relation to the base body 68. The leg 66 has its distal end 67 bent to extend in opposed relation to the base body 68. The leg 66 extends from the proximal end 64a by a distance W greater than a thickness T (see FIG. 10) of the window pane 13. The base body 68 and each hook-shaped portion 64 jointly define a receiving pocket 69 for receiving the front part of the peripheral end 13a of the window pane 13.

Figure 10:
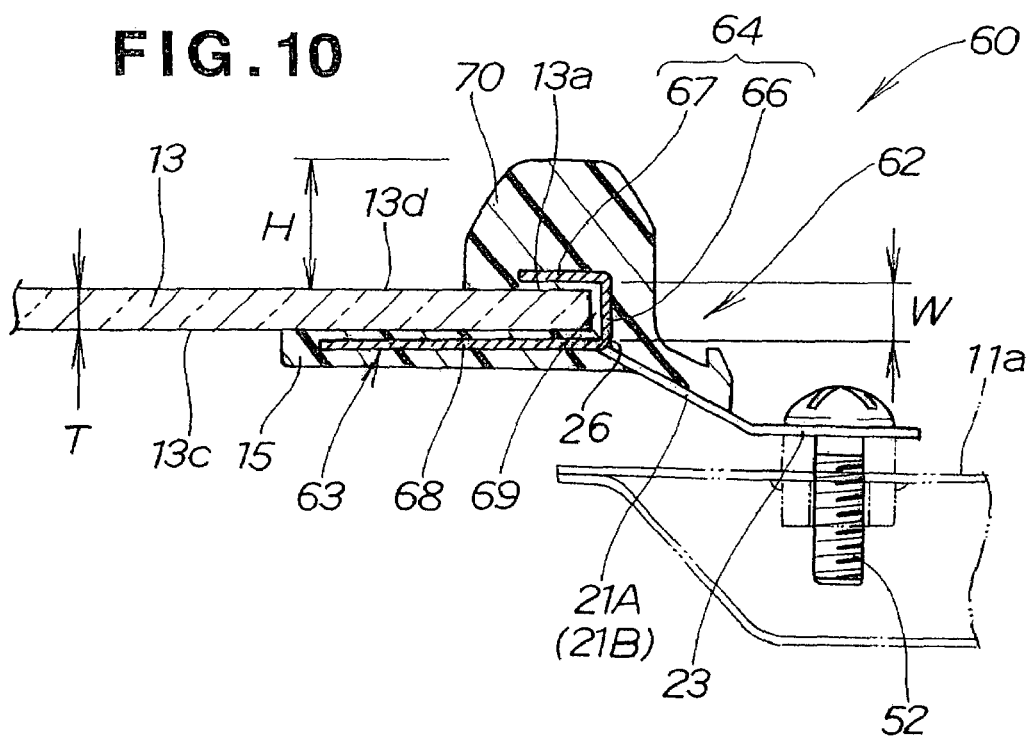
FIG. 10 is a cross-sectional view of the window pane structure of the third embodiment mounted to a sash of the automobile.

As shown in FIG. 10, while a molding 70 is injection molded from PVC (polyvinyl chloride) along the peripheral edge 13a of the window 13, the resin layer 15 is injection molded on the interior surface 13a of the window pane 13 to embed the base 63 therein. The attachment portion 23 is secured to the sash 11a of the automobile 11 through a bolt 52.

The hook-shaped portions 64 disposed at the portions of the front edge 26 positioned in the vicinities of the supporting arms 21A, 21B cooperate with the base body 68 to define the pockets 69 for receiving the front part of the peripheral edge 13a of the window pane 13. With such hook-shaped portions 64, the peripheral edge 13a of the window pane 13 can be covered at its portions positioned in the vicinities of the supporting arms 21A, 21B.

Because the hook-shaped portions 64 cover the portions of the peripheral edge 13a positioned in the vicinities of the arms 21A, 21B, the hook-shaped portions are prevented from coming off the peripheral end 13a. Additionally, the base 63 is firmly retained in the resin layer 15.

The window pane structure 60 was subjected to a peeling test. The result from the test shows that even with no primer applied to the hinge member 62, the hinge member 62 was not peeled away from the window pane 13 at a temperature of as high as 80 degrees Celsius.

Because the distal end 67 is disposed outside the exterior surface 13d, it would be directly viewed from outside the automobile 11 without any covering for the distal end 67.

In this embodiment, however, the molding 70 has a thickness H sufficient to prevent the distal end 67 from being directly viewed from outside the automobile 11. Because the distal end 67 is hidden within the thick molding 70, the distal end 67 can not be viewed from the outside. Accordingly, the window pane structure 60 provides its improved outer appearance, as does the structure 10.

Figure 11:
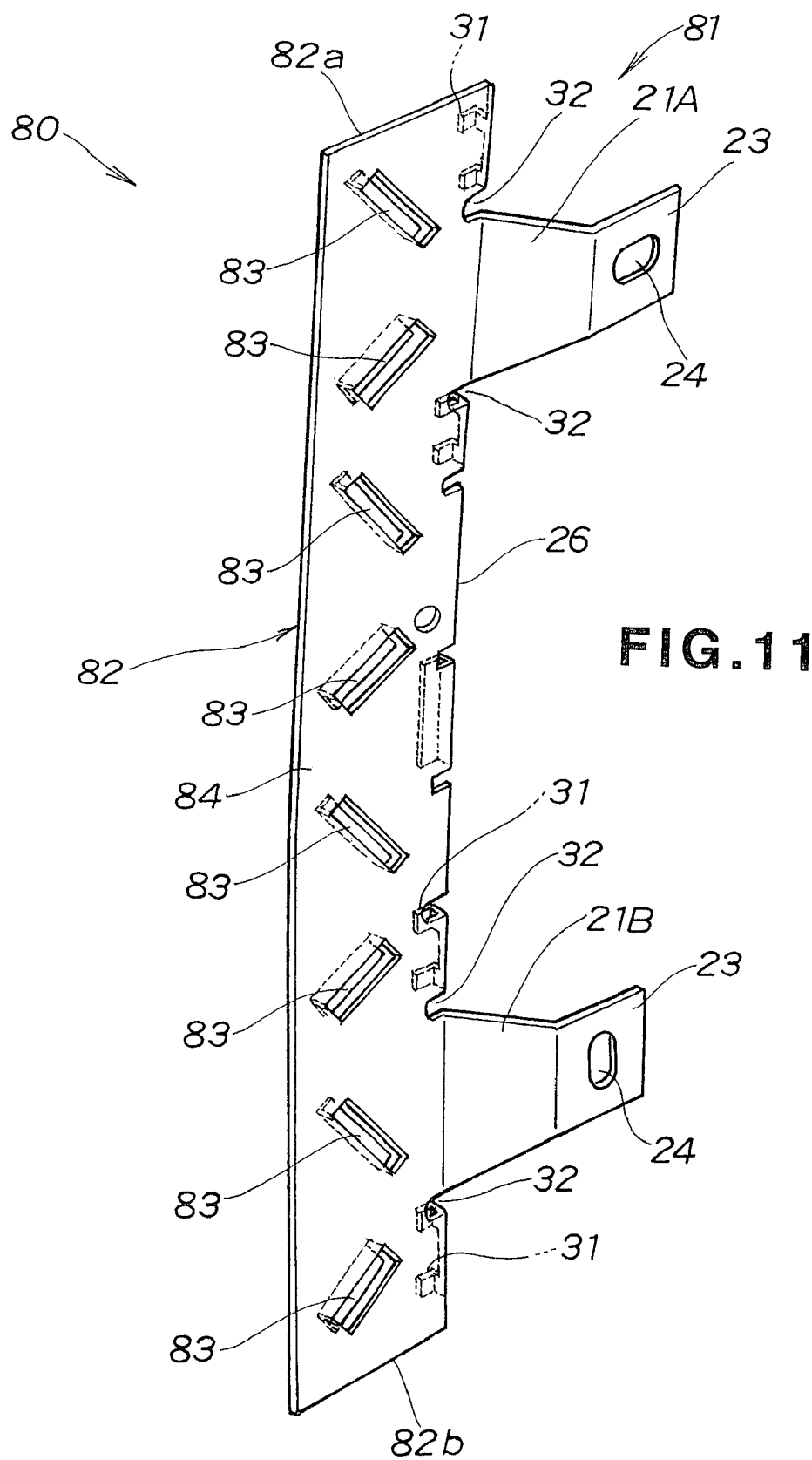
FIG. 11 is a perspective view of a hinge member of an automobile window pane structure according to a fourth embodiment of the present invention.

As shown in FIG. 11, a hinge member 81 of an automobile window pane structure 80 according to a fourth embodiment of the present invention includes a base 82. Except for the base 82, the structure 80 is the same arrangement as the structure 10.

The base 82 is of vertically elongated rectangular configuration and includes a base body 84 having top and bottom edges 82a, 82b, and plural (or example, seven) inverted L-shaped portions 83 protruding from the base body 84 and disposed adjacent each other in a staggered fashion along the entire length of the base 82.

The inverted L-shaped protruding portion 83 is the same in arrangement as the inverted L-shaped protruding portion 33-1 or 33-2 (see FIG. 3) and is inclined relative to a line extending between the upper and lower supporting arms 21A, 21B, or relative to a longitudinal direction of the base 82.

By inclining relative to the longitudinal direction of the base, each inverted L-shaped portion 83 has its greater length than by lying horizontally in parallel to the edges 82a, 82b.

The adjacent protruding portions 83, 83 are disposed in the staggered fashion. Such disposition of the portions 83 makes it possible to prevent the base 82 from being displaced vertically out of the resin layer 15 during the embedment of the base 82 in the layer 15.

Figure 12:
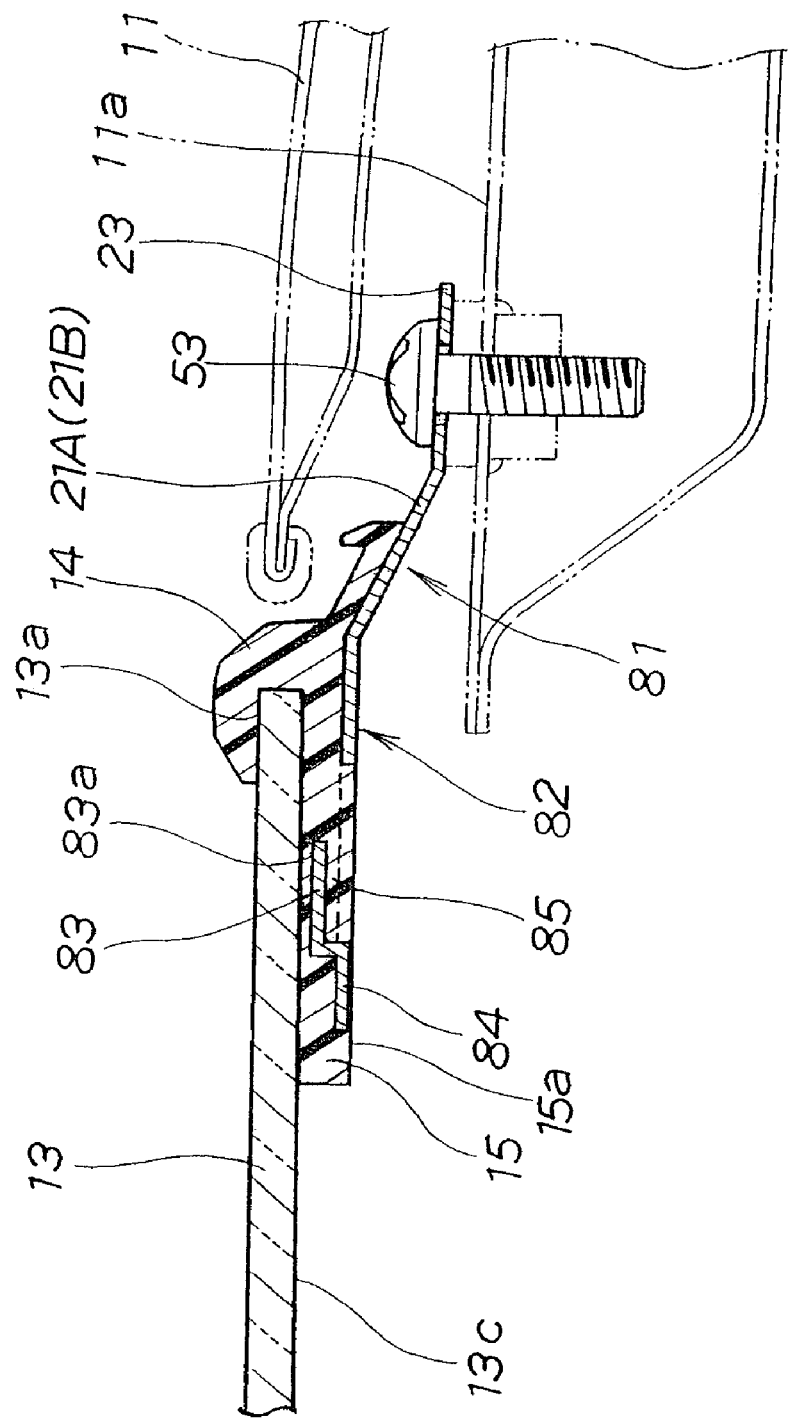
FIG. 12 is a cross-sectional view of the window pane structure of the fourth embodiment mounted to the sash of the automobile.

As shown in FIG. 12, the inverted L-shaped protruding portion 83 protrudes with its distal end 83a extending towards the front edge 26 in parallel to the base body 84 and disposed closely to the window pane 13 to thereby define a space 85 on a side of the distal end 83a opposite to the window pane 13.

Because the distal end 83a of the inverted L-shaped portion 83 is disposed closely to the window pane 13, there can be increased a distance between the interior surface 15a of the resin layer 15 and the distal end 83a.

The resin of the resin layer 15 fills the space 85 and therefore the respective inverted L-shaped protruding portions 83 can be deeply embedded in the layer 15. This means that the base 82 is firmly retained in the resin layer 15.

Figure 13:
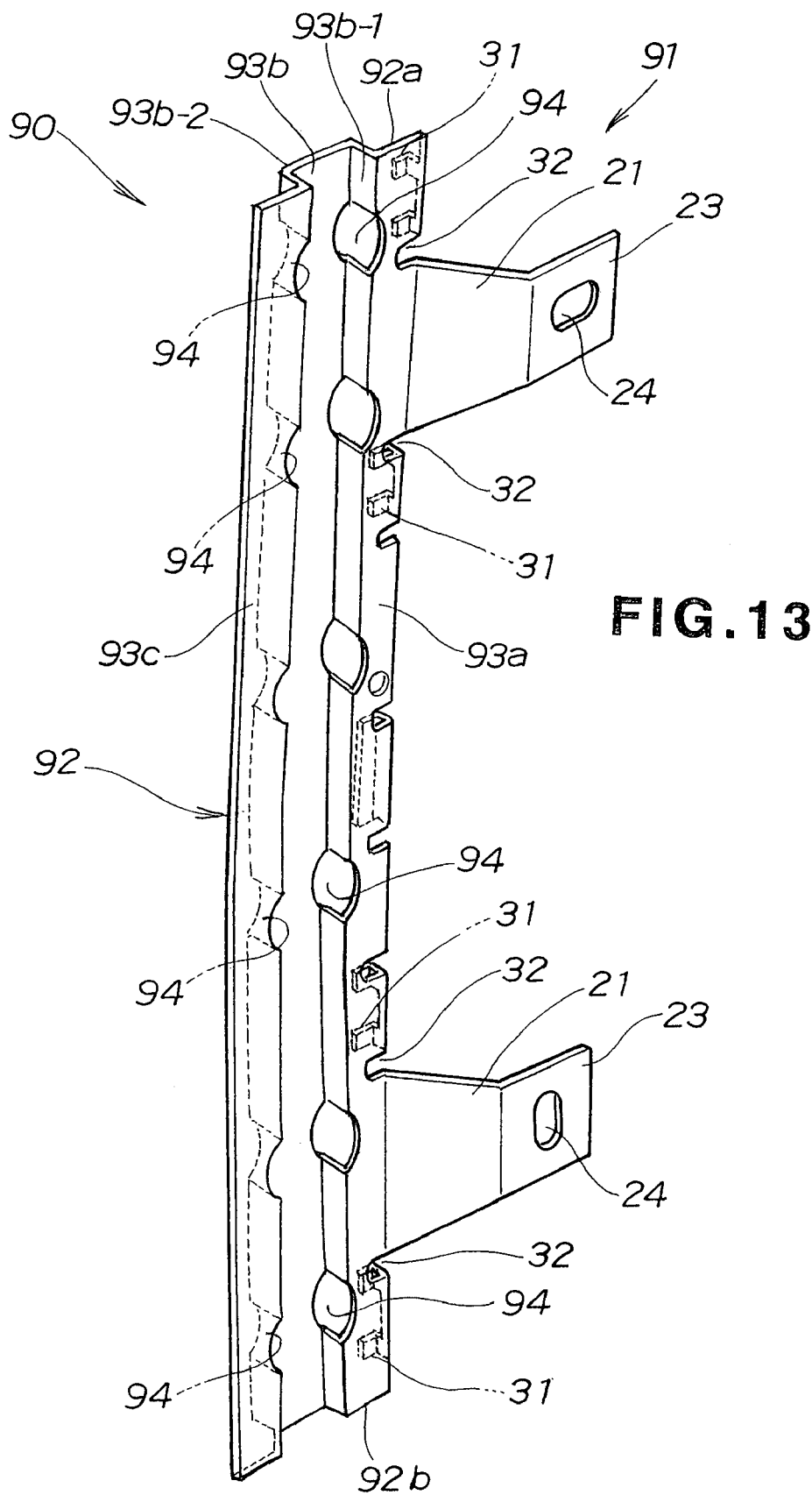
FIG. 13 is a perspective view of a hinge member of an automobile window pane structure according to a fifth embodiment of the present invention.

As shown in FIG. 13, a hinge member 91 of an automobile window pane structure 90 according to a fifth embodiment of the present invention includes a vertically elongated base 92 having top and bottom ends 92a, 92b. Except for the base 92, the structure 90 is the same in arrangement as the structure 10.

The base 92 includes front, center and rear portions 93a, 93b, 93c all of which extend between the top and bottom ends 92a, 92b. The center 93b protrudes from the front and rear portions 93a, 93c towards the window pane 13 (See FIG. 14) in the form of an inverted U. The center 93b includes front and rear proximal portions (only front one of which is designated at 93b-1) protruding from the front and rear portions 93a, 93c, respectively, and disposed in spaced and opposed relation to each other. The center 93b further includes a distal portion 93b-2 extending between the front and rear proximal portions in parallel to the front and rear portions 93a, 93c. The center 93b has plural vertically equally spaced-apart sets of two horizontally spaced-apart openings 94 formed on the front and rear proximal portions, respectively.

Figure 14:
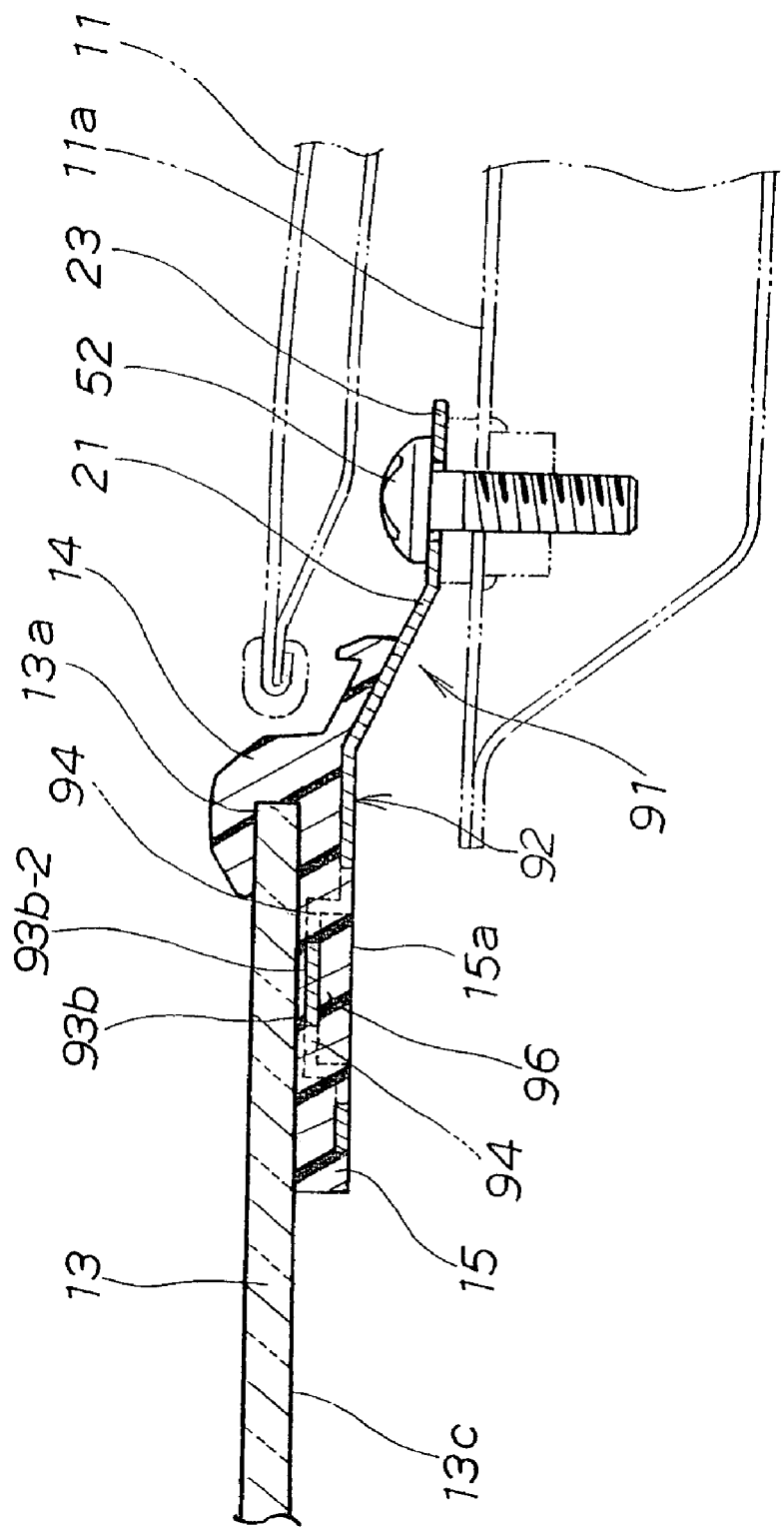
FIG. 14 is a cross-sectional view of the window pane structure of the fifth embodiment mounted to the sash of the automobile.
Figure 15:
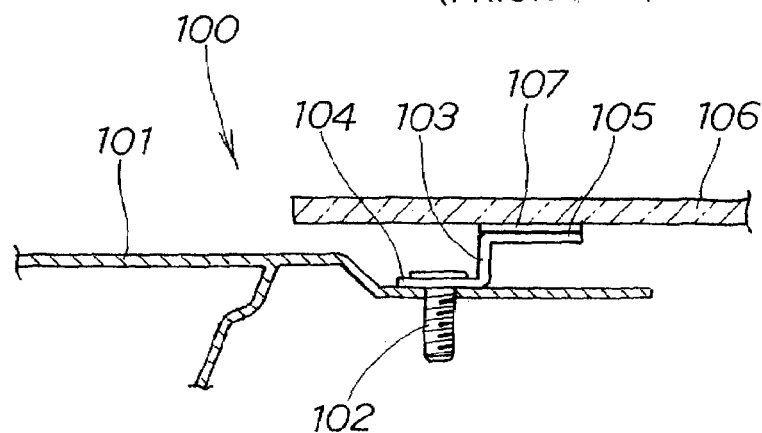
FIG. 15 is a cross-sectional view of an automobile body and a window pane mounted to each other via a conventional hinge member.
Figure 16:
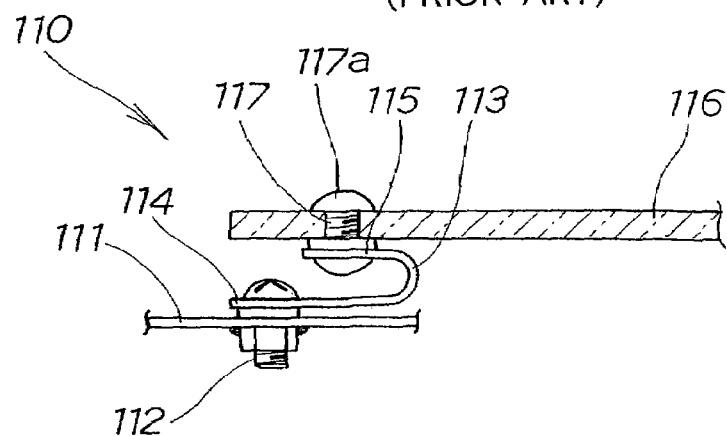
FIG. 16 is a cross-sectional view of a window pane mounted to a conventional hinge member different from that of FIG. 15.
Figure 17:
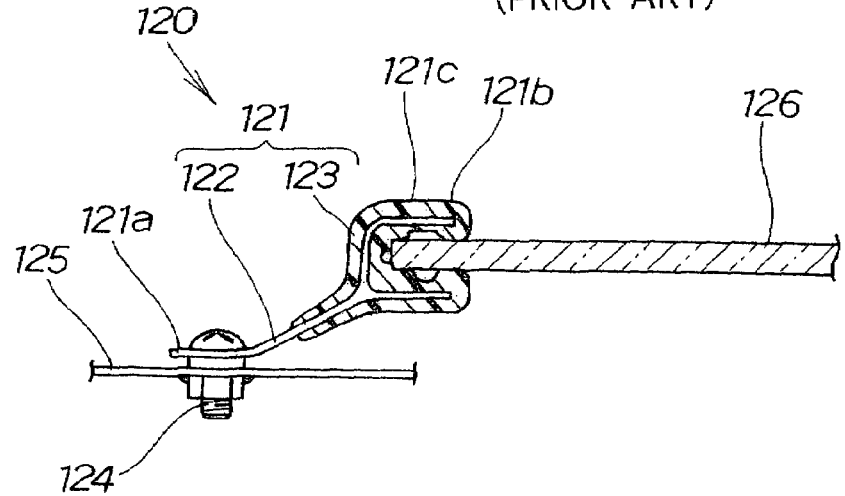
FIG. 17 is a cross-sectional view of a window pane mounted to a conventional hinge member different from the preceding two hinge members of FIG. 15 and FIG. 16.

Referring to FIG. 14, the distal portion 93b-2 of the center 93b is closed to the window pane 13 to provide a space or recess 96.

Because the distal portion 93b-2 is disposed closely to the window pane 13, there can be an increased distance between the distal portion 93b-2 and the interior surface 15a.

The recess 96 is filled with the resin of the resin layer 15 and hence the center 93b can be deeply embedded in the resin layer 15. This means that the base 92 is firmly retained in the resin layer 15.

The openings 94 allow the resin to flow therethrough to achieve the satisfactory insert molding of the resin layer 15. By thus passing through the openings 94, the resin enters a gap between the distal portion 93b-2 and the window pane 13 to thereby firmly adhere to the window pane 13.

Although the present invention has been described as being applied to the window pane of the rear quarter window, it is applicable to other window panes for a front quarter window, a large-sized quarter window, a sun roof or the like.

In the above embodiments, the resin layer 15 integral with the molding 14 or 70 is molded from the thermoplastic resin, PVC. In this regard, the resin for the resin layer 15 is not limited to PVC. No primer may be used if the layer 15 is molded from such resin as to maintain its rigidity, particularly, at a high temperature.

Each of the projecting portions 30-1 to 30-6 are oriented widthwise of the base 20, however, it may be oriented vertically with its upper and lower curved edges 38, 39 elongated vertically to provide vertically elongated slits 35, 35.

Obviously, various minor changes and modifications of the present invention are possible in the light of the above teaching. It is therefore to be understood that within the scope of the appended claims the invention may be practices otherwise than as specifically described.

What is claimed is:

1. An automobile window pane structure comprising:
   a window pane;
   a single hinge means for mounting the window pane to a sash of an automobile so as to allow movement of the window pane between open and closed positions; and
   a resin layer provided on an interior surface of the window pane along a peripheral edge portion of the window pane and serving to secure the hinge means to the window pane,
   the hinge means including:
      a base embedded in the resin layer and extending along the peripheral edge portion of the window pane;
      a pair of elastically deformable supporting arms for supporting the window pane, said supporting arms extending from the base and projecting from the resin layer; and
      attachment portions each disposed at a distal end of each supporting arm and having an attachment opening formed therein for attachment to the sash to allow each supporting arm to undergo elastic deformation for moving the window pane between the open and closed positions;
   wherein the base includes an elongated base body parallel spaced from the window pane, and a plurality of projecting portions disposed longitudinally along the base portion and each protruding from the base body towards the window pane so as to define a slit in the base body, the slit being filled with a material of the resin layer, and wherein the projecting portions are disposed in the vicinities of the supporting arms and projecting towards the window pane in the form of a convex curve, the projecting portions each having a hole formed centrally thereof, the projecting portions each having curved edges each spaced from the base body to define a slit therebetween.

2. The automobile window pane structure according to claim 1, wherein the base body further includes at least one inverted L-shaped protruding portion disposed so as to avoid the projecting portions and protruding from the base body towards the window pane substantially in the form of an inverted L, the inverted L-shaped protruding portion being inclined relative to a straight line extending between the supporting arms.

3. The automobile window pane structure according to claim 2, wherein the base body includes a plurality of the inverted L-shaped protruding portions disposed adjacent each other, the inverted L-shaped protruding portions being disposed in a staggered fashion.

4. The automobile window pane structure according to claim 1, wherein the base body has an edge having the pair of supporting arms extending therefrom, the base further including reinforcing portions protruding from portions of the edge positioned in the vicinities of the supporting arms towards the window pane for reinforcing the edge.

5. The automobile window pane structure according to claim 4, wherein the supporting arms have proximal ends connected with the edge, and the base body further includes cutouts formed on sides of the proximal ends.

6. An automobile window pane structure comprising:
   a window pane;
   a single hinge means for mounting the window pane to a sash of an automobile so as to allow movement of the window pane between open and closed positions; and
   a resin layer provided on an interior surface of the window pane along a peripheral edge portion of the window pane and serving to secure the hinge means to the window pane,
   the hinge means including:
      a base embedded in the resin layer and extending along the peripheral edge portion of the window pane;
      a pair of elastically deformable supporting arms for supporting the window pane, said supporting arms extending from the base and projecting from the resin layer; and
      attachment portions each disposed at a distal end of each supporting arm and having an attachment opening formed therein for attachment to the sash to allow each supporting arm to undergo elastic deformation for moving the window pane between the open and closed positions;
   wherein the base includes an elongated base body parallel spaced from the window pane, and a plurality of projecting portions disposed longitudinally along the base portion and each protruding from the base body towards the window pane so as to define a slit in the base body, the slit being filled with a material of the resin layer, and wherein said projecting portions terminate short of the interior surface of the window pane.

7. The automobile window pane structure according to claim 6, further including a molding of synthetic resin injection molded on the peripheral edge portion of the window pane along the entire circumference of the window pane, wherein the resin layer is injection molded on the interior surface of the window pane and integral with the molding.

8. The automobile window pane structure according to claim 6, wherein the elongated base body has an edge from which the supporting arms extend, and hook-shaped portions extend from portions of the edge positioned in the vicinities of the supporting arms to cover a peripheral edge of the window pane.

9. The automobile window pane structure according to claim 6, wherein the window pane has a height direction with a height dimension and a width direction with a width dimension, and wherein said base extends along the window pane height direction and has a height dimension that is 50% to 95% of the height dimension of the window pane.

10. The automobile window pane structure according to claim 9, wherein said base has a width dimension that is 5% to 15% of the width dimension of the window pane.

* * * * *